Nov. 22, 1966
J. F. WYGANT ETAL
3,286,665
INSULATED CONTAINER
Filed June 1, 1965
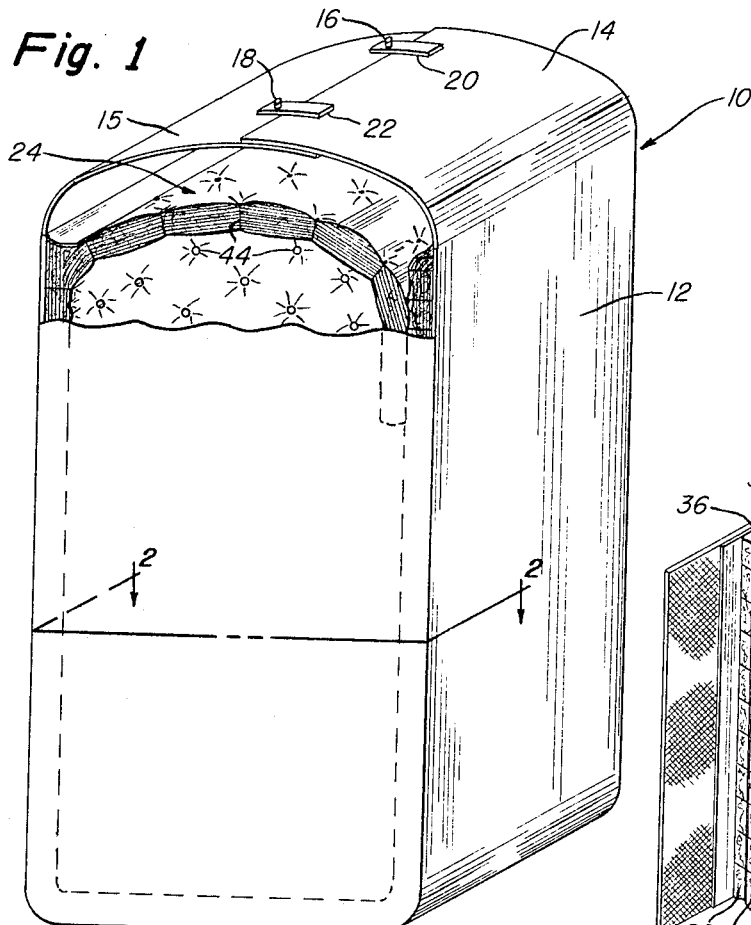
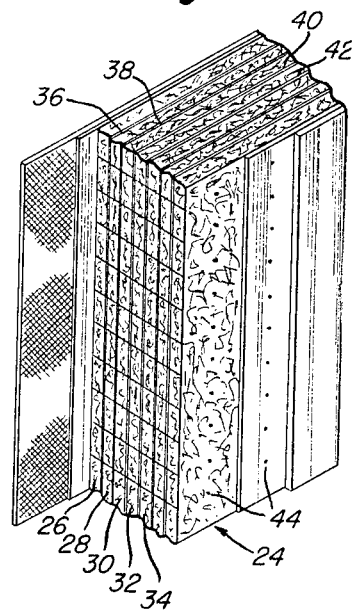
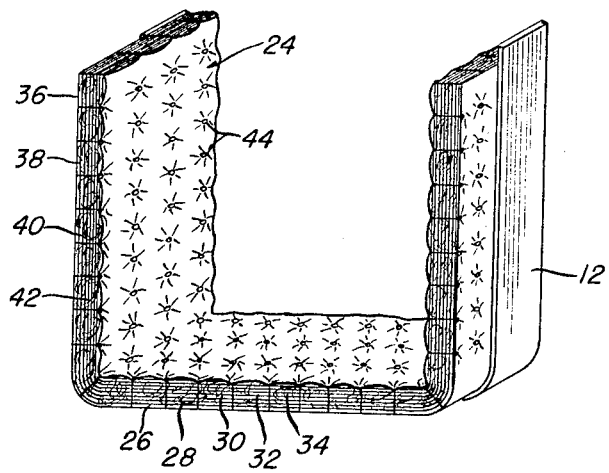
INVENTORS:
James F. Wygant
John J. Petkus
BY
William Lohff
ATTORNEY

United States Patent Office 3,286,665
Patented Nov. 22, 1966

3,286,665
INSULATED CONTAINER
James F. Wygant, Gary, and John J. Petkus, Whiting, Ind., assignors to Standard Oil Company, Chicago, Ill., a corporation of Indiana
Filed June 1, 1965, Ser. No. 460,373
6 Claims. (Cl. 109—82)

This invention relates to a fire- and heat-resistant container for mail, express packages, and the like, and, more particularly, to a non-rigid container, which provides increased protection of the contents against the effects of heat and fire. More specifically, the invention relates to a flexible container with walls that expand upon exposure to excess temperature caused by fire and provide increased insulating properties.

There is a need for a lightweight, non-rigid container for mail and other valuables that will protect them from injury or damage in the case of a crash or wreck of an airplane or other vehicle and the subsequent spreading and burning of the fuel supply, and that can be collapsed to save space when not in use. In general, the lightweight containers in the past have not provided entirely satisfactory heat and fire resistance, and those which have provided better heat and fire resistance have tended to be considerably bulky, excessively heavy, and to lack the desired degree of flexibility.

One object of this invention is a lightweight, non-rigid container for carrying mail and other valuables. Another object of the invention is a container with improved heat and fire resistance. Still another object of the invention is a lightweight, non-rigid container for paper products which exhibits improved insulating properties upon exposure to heat and fire. Other objects of the invention will become apparent from the following detailed description of the invention.

This invention is directed to a lightweight, non-rigid container which provides increased protection against the effects of heat and fire. The container offers the advantages of being flexible and relatively thin-walled during normal use and being rapidly expandable to have thicker walls upon exposure to excess temperature. The resultant thicker walled container exhibits increased insulating properties to protect the contents against heat and fire.

The container comprises a wall and closing means with the wall comprising compacted layers of resilient thermal-insulating material, such as resilient glass fibers, and heat-destructible fastening means, such as nylon fasteners or nylon thread sewn through the compacted layers to form a quilt effect. In addition, a heat-reflecting material, such as thin aluminum sheeting, may be used to improve the insulating properties of the wall. Preferably, the heat-reflecting material is used in alternating layers with the thermal-insulating material. Upon exposure to excess temperature, the fastening means melts or is otherwise destroyed which permits the compacted resilient layers to expand and increase the insulating properties of the container.

Having thus indicated the general nature of the invention, reference is made to the accompanying drawing, forming a part of this specification and showing one illustrative embodiment of the invention, wherein:

FIGURE 1 is a side view of a container showing a particular closing means. The container also shows an outer surface, which is not connected to the compacted resilient inter-layers and thereby serves as a wear- and weather-resistant layer.

FIGURE 2 is a sectional view taken along lines 2—2 in FIGURE 1 showing the compacted layers which form the insulating wall of the container.

FIGURE 3 is also a fragmental sectional view of the container after the fastening means has been destroyed and the layers have been allowed to expand.

In FIGURE 1, container 10 with outer layer 12 is shown together with a closing means illustrated by fold-over flaps 14 and 15 which can be snapped together and hooked as shown by snaps 16 and 18 and hooks 20 and 22. Outer layer 12 being free of a fastening means illustrates that in some instances an outer wear and weather-proof layer, which does not have openings for the attachment of a fastening means, is advantageous. A similar inner-layer may also be provided.

In FIGURE 2, wall 24 comprises compacted layers 26, 28, 30, 32 and 34 of a resilient thermal-insulating material and layers 36, 38, 40, and 42 of a heat-reflecting material. The layers are held in a compacted condition by fastening means illustrated by nylon thread 44 which has been sewn or woven through the layers 26–42 to form a quilted effect.

In FIGURE 3, wall 24 has been exposed to excess temperature which has melted the nylon fastening means 44 and permitted the compacted resilient layers to expand and increase the insulating properties of the container. It is not uncommon for wall 24 to expand to a thickness of at least twice that of the compacted thickness.

As will be noted from the drawings, the fastening means is connected to the layers of resilient material to compact and hold them together. In addition to thread, the fastening means may be illustrated by other fasteners, such as staples, buttons and the like. The fastening means is destroyed upon exposure to moderately elevated temperatures, thereby permitting the compacted, resilient layers to expand.

When the containers will commonly enclose combustible materials, such as paper products, which char at temperatures in the order of 260° C., the fastening means advantageously is a material which is destroyed well before the inner surface of the container reaches the charring temperature. Since organic thermoplastic materials, such as the aliphatic polyamides, polyacrylonitriles, polypropylenes, and polymers of vinylidene chloride, melt, soften, or are otherwise destroyed by exposure to moderately elevated temperatures below about 300° C., these materials are advantageously used for the heat-destructible fastening means. The aliphatic polyamides with softening temperatures of about 230–270° C. are particularly useful for the fastening means.

The thermal-insulating material is preferably an inorganic fiber insulation such as a fine glass fiber with little or no resin binders. Advantageously, it has a relatively high bulk density such as about 4 lb./ft.$^3$ and is in the form of fibers several inches long randomly oriented to form a felt or blanket. Suitable fibers include those based on silica, aluminosilicate and borosilicate glasses.

The heat-reflecting material includes aluminum or other high melting, corrosion-resistant material, such as stainless steel. It is preferred to use aluminum in the form of thin sheets with a thickness of about 0.001" to provide a desired combination of heat reflection and flexibility.

The container is formed from layers of the thermal-insulating material and preferably layers of heat-reflecting material. Advantageously, these layers are placed in an alternating pattern with a total of layers being in the order of 4 to 20 layers and more commonly about 12 to 20. The layers may be sewn together using a thread of a thermoplastic material. Usually, it is advantageous to include a wear- and weather-resistant outer layer which is free of any openings due to the fastening means, and in some instances a similar inner layer is also advantageous.

The construction of the closing means may vary, but it should not be loosened or allowed to open when the container is exposed to elevated temperatures. Suitably, the closing means is a flap closure secured by buttons, snaps, or zippers.

While the invention has been described in conjunction with specific embodiments thereof, these are illustrative only. Accordingly, many alternatives, modifications, and variations will be apparent to those skilled in the art in the light of the foregoing description, and it is therefore intended to embrace all such alternatives, modifications, and variations as to fall within the spirit and broad scope of the appended claims.

We claim:

1. A light-weight, non-rigid container for combustible materials which provides increased protection against the effects of heat and fire, which container comprises a wall and closing means, said wall comprising compacted layers of resilient thermal-insulating material, and heat-destructible fastening means connected to said layers to hold them together, said fastening means being destroyed upon exposure to moderately elevated temperatures below about 300° C., thereby permitting the compacted layers of said wall to expand and separate and to provide increased protection to the combustible materials in said container.

2. The container of claim 1 wherein said fastening means is a thermoplastic organic polymer.

3. The container of claim 1 wherein said fastening means is an aliphatic polyamide having a softening temperature about 230–270° C. and is used as a thread to quilt the layers together.

4. A light-weight, non-rigid container for paper products which provides increased protection against the effects of heat and fire, which container comprises compacted layers of resilient thermal-insulating material and heat-reflecting material, and thermoplastic non-metallic fastening means connected to said layers to hold them together, said fastening being destroyed upon exposure to moderately elevated temperatures below about 300° C., and releasing said layers thereby permitting them to expand and to increase the protection provided by said container to said products.

5. The container of claim 4 wherein said layers of thermal-insulating material and heat-reflecting material are in an alternating pattern.

6. The container of claim 5 wherein said thermal-insulating material is composed of glass fibers, said heat-reflecting material is aluminum and said fastening means is a thread.

References Cited by the Examiner

UNITED STATES PATENTS

| | | | |
|---|---|---|---|
| 1,956,323 | 4/1934 | Gregg | 220—9 |
| 3,066,847 | 12/1962 | Fortune | 109—82 |

REINALDO P. MACHADO, *Primary Examiner.*